United States Patent [19]

Dudrey et al.

[11] Patent Number: 5,797,973
[45] Date of Patent: *Aug. 25, 1998

[54] AIR FILTRATION ARRANGEMENT AND METHOD

[75] Inventors: Denis J. Dudrey, Bloomington; Brad Kahlbaugh, Roseville; Erland D. Anderson, Farmington, all of Minn.

[73] Assignee: Donaldson Company, Inc., Minneapolis, Minn.

[*] Notice: The term of this patent shall not extend beyond the expiration date of Pat. No. 5,669,949.

[21] Appl. No.: 841,499

[22] Filed: Apr. 23, 1997

Related U.S. Application Data

[62] Division of Ser. No. 426,220, Apr. 21, 1995, Pat. No. 5,669,949.
[51] Int. Cl.$^6$ ................................................. B01D 46/00
[52] U.S. Cl. ............................ 55/372; 55/382; 55/486; 55/487; 55/498; 55/524; 55/528
[58] Field of Search ............................ 55/363, 372, 382, 55/379, 485, 486, 487, 498, 502, 524, 528, DIG. 28; 95/287; 96/191

[56] References Cited

U.S. PATENT DOCUMENTS 1,743,675  1/1930  Jordahl.
1,771,639  7/1930  Jordahl.
2,174,528  10/1939  Prentiss.

(List continued on next page.)

FOREIGN PATENT DOCUMENTS

| 235490 | 3/1960 | Australia. |
|---|---|---|
| 0001407 A1 | 4/1979 | European Pat. Off.. |
| 0 053 879 A3 | 6/1982 | European Pat. Off.. |
| 0 212 082 A1 | 3/1987 | European Pat. Off.. |
| 0347188 A2 | 12/1989 | European Pat. Off.. |
| 2 380 058 | 2/1978 | France. |
| 3513062 A1 | 10/1986 | Germany. |
| 92 04 169.8 | 7/1992 | Germany. |
| 60-147206 | 3/1985 | Japan. |
| 62-155912 | 10/1987 | Japan. |
| 585295 | 3/1947 | United Kingdom. |
| 1401231 | 7/1975 | United Kingdom. |
| 1460925 | 1/1977 | United Kingdom. |
| 2 084 897 | 4/1982 | United Kingdom. |
| 2101902 | 1/1983 | United Kingdom. |
| 2152399 | 8/1985 | United Kingdom. |
| WO 79/00978 | 11/1979 | WIPO. |
| WO 84/03450 | 9/1984 | WIPO. |

OTHER PUBLICATIONS

Clarke, A. Rodman, et al., "Nonwovens in Filtration/Separation", Nonwoven Fabrics Forum, Jun. 21–23, 1988, Clemson University, Clemson, SC.

Ashrae Standard, "Method of Testing Air–Cleaning Devices Used In General Ventilation For Removing Particulate Matter", ©1974, The American Society of Heating, Refrigerating, and Air Conditioning Engineers, Inc., 345 East 47th Street, New York, NY 10017.

1989 SAE Handbook, vol. 3, "Engines, Fuels, Lubricants, Emissions & Noise", pp. 24.45–24.27.

T. Jaroszczyk, "Experimental Study of Nonwoven Filter Performance Using Second Filter Orthogonal Design", Corporate Research Department, Nelson Industries, Inc., *Particulate Science and Technology*, 5:271–287, 1987.

*Primary Examiner*—C. Scott Bushey
*Attorney, Agent, or Firm*—Merchant, Gould, Smith, Edell, Welter & Schmidt, P.A.

[57] ABSTRACT

Constructions and methods are described for collecting particulate material from gas streams. In certain specifically described air filter arrangements, a first, rigid, filter construction is used in conjunction with a removable and replaceable depth media filter, to form filter media. The preferred arrangement is configured so that the removable and replaceable depth media filter can be removed and replaced, without disengaging the first filter construction from a filter assembly or housing, if desired. Some preferred configurations and materials are described.

22 Claims, 7 Drawing Sheets

U.S. PATENT DOCUMENTS

| Patent # | Date | Inventor | Class |
|---|---|---|---|
| 2,334,840 | 11/1943 | Punton et al. | |
| 2,420,414 | 5/1947 | Briggs | 210/169 |
| 2,918,138 | 12/1959 | Lewis | |
| 2,966,960 | 1/1961 | Rochlin | |
| 3,189,179 | 6/1965 | McMichael | 210/238 |
| 3,261,473 | 7/1966 | Riede | 210/282 |
| 3,290,870 | 12/1966 | Jensen | 55/486 |
| 3,298,149 | 1/1967 | Sobeck | |
| 3,399,516 | 9/1968 | Hough, Jr. et al. | 55/487 |
| 3,417,551 | 12/1968 | Bonell | 55/498 |
| 3,520,417 | 7/1970 | Durr et al. | 210/493 |
| 3,527,027 | 9/1970 | Knight et al. | 55/487 |
| 3,552,553 | 1/1971 | Reading | 210/484 |
| 3,578,175 | 5/1971 | Manjikian | 210/489 |
| 3,680,659 | 8/1972 | Kasten | |
| 3,727,769 | 4/1973 | Scholl | 210/484 |
| 3,766,629 | 10/1973 | Lechtenberg | 29/412 |
| 3,802,160 | 4/1974 | Foltz | 55/487 |
| 3,822,531 | 7/1974 | Wisnewski et al. | 55/315 |
| 3,918,945 | 11/1975 | Holloway et al. | 55/350 |
| 3,990,333 | 11/1976 | Davis | |
| 4,032,688 | 6/1977 | Pall | 428/36 |
| 4,074,985 | 2/1978 | Willas | 55/498 |
| 4,086,070 | 4/1978 | Argo et al. | |
| 4,089,783 | 5/1978 | Holyoak | 210/358 |
| 4,093,437 | 6/1978 | Ichihara et al. | 55/487 |
| 4,102,785 | 7/1978 | Head et al. | 210/65 |
| 4,104,170 | 8/1978 | Nedza | 210/487 |
| 4,111,815 | 9/1978 | Walker et al. | 55/486 |
| 4,211,543 | 7/1980 | Tokar et al. | 55/485 |
| 4,218,324 | 8/1980 | Hartmann et al. | 210/493 R |
| 4,233,042 | 11/1980 | Tao | 55/482 |
| 4,243,397 | 1/1981 | Tokar et al. | 55/487 |
| 4,259,096 | 3/1981 | Nakamura et al. | 55/498 |
| 4,314,832 | 2/1982 | Fox | 55/482 |
| 4,322,230 | 3/1982 | Schoen et al. | |
| 4,477,270 | 10/1984 | Tauch | 55/485 |
| 4,536,440 | 8/1985 | Berg | 428/284 |
| 4,539,107 | 9/1985 | Ayers | 210/96.1 |
| 4,619,674 | 10/1986 | Erdmannsdorfer | 55/486 |
| 4,629,483 | 12/1986 | Stanton | 55/487 |
| 4,647,373 | 3/1987 | Tokar et al. | 210/232 |
| 4,650,506 | 3/1987 | Barris et al. | 55/487 |
| 4,660,779 | 4/1987 | Nemesi et al. | 242/7.02 |
| 4,693,985 | 9/1987 | Degen et al. | 436/531 |
| 4,695,300 | 9/1987 | Takagi | 55/485 |
| 4,701,197 | 10/1987 | Thornton et al. | 55/487 |
| 4,720,292 | 1/1988 | Engel et al. | 55/337 |
| 4,758,460 | 7/1988 | Spicer et al. | 428/159 |
| 4,767,426 | 8/1988 | Daly et al. | 55/487 |
| 4,838,903 | 6/1989 | Thomaides et al. | 55/486 |
| 4,878,929 | 11/1989 | Tofsland et al. | 55/486 |
| 4,882,056 | 11/1989 | Degen et al. | 210/490 |
| 4,976,759 | 12/1990 | Foltz | 55/487 |
| 5,015,375 | 5/1991 | Fleck | 210/232 |
| 5,082,476 | 1/1992 | Kahlbaugh et al. | 55/487 |
| 5,084,178 | 1/1992 | Miller et al. | 210/493.5 |
| 5,102,436 | 4/1992 | Grabowski | 55/483 |
| 5,171,342 | 12/1992 | Trefz | 55/487 |
| 5,238,474 | 8/1993 | Kahlbaugh et al. | 55/320 |
| 5,252,207 | 10/1993 | Miller et al. | 210/335 |
| 5,279,731 | 1/1994 | Cook et al. | 210/232 |
| 5,364,456 | 11/1994 | Kahlbaugh et al. | 95/287 |
| 5,415,676 | 5/1995 | Tokar et al. | 55/498 |
| 5,423,892 | 6/1995 | Kahlbaugh et al. | 55/320 |
| 5,468,382 | 11/1995 | Cook et al. | 210/232 |
| 5,476,585 | 12/1995 | Mills | 210/232 |
| 5,669,949 | 9/1997 | Dudrey et al. | 55/486 |

FIG. 7
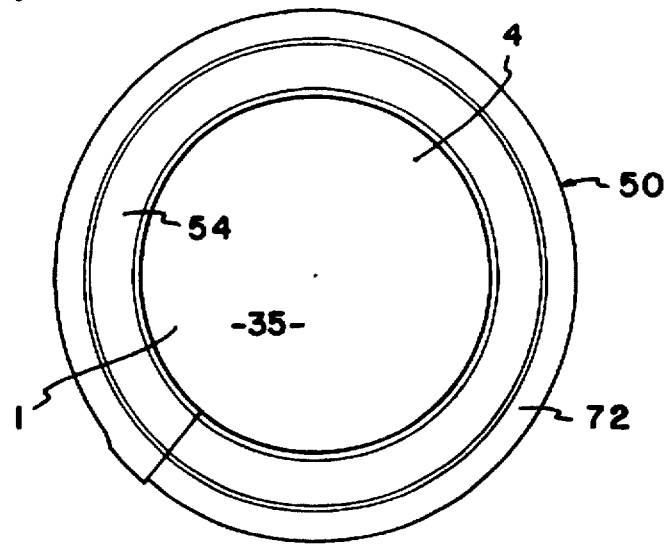
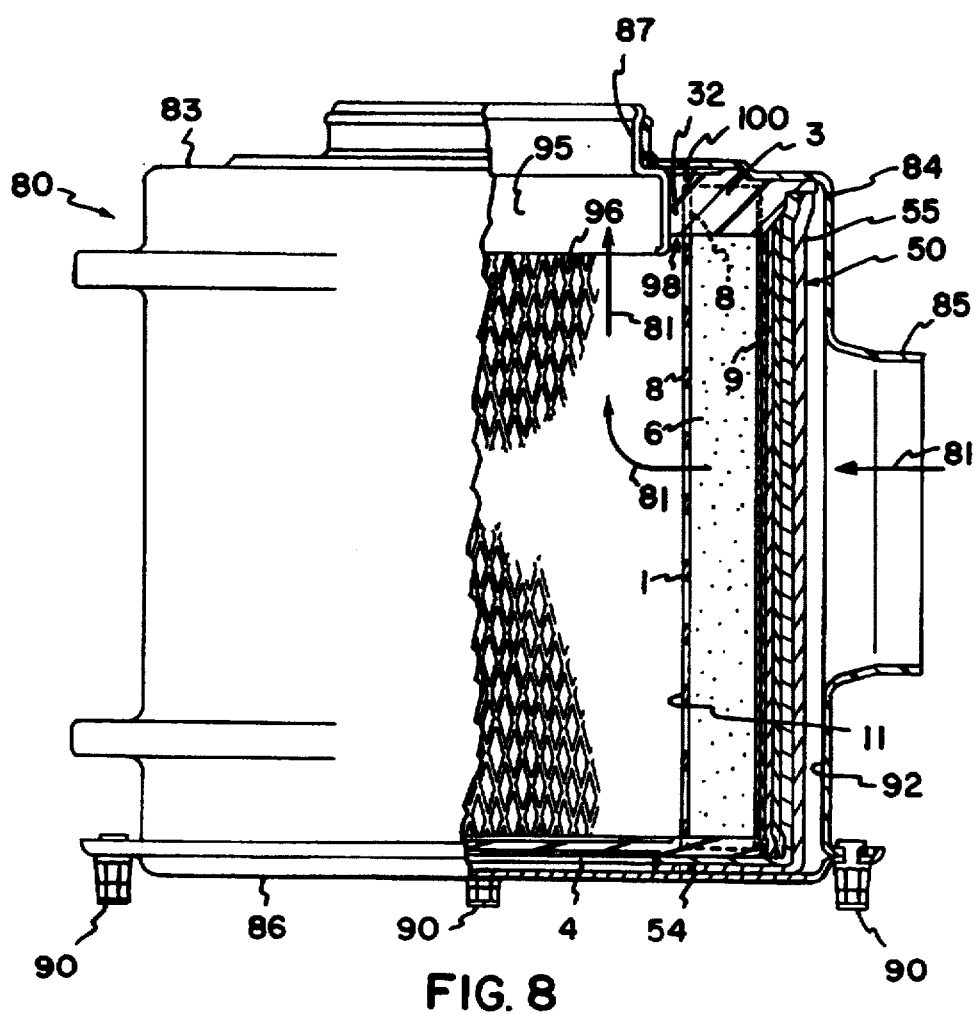
FIG. 8

AIR FILTRATION ARRANGEMENT AND METHOD

CROSS-REFERENCE TO PARENT AND CLAIM OF PRIORITY

This application is a divisional of U.S. patent application Ser. No. 08/426,220, filed Apr. 21, 1995, now U.S. Pat. No. 5,669,949 which application is incorporated herein by reference.

FIELD OF THE INVENTION

The present invention relates to filter arrangements. More specifically, it concerns arrangements for filtering particulate material from gas flow streams, for example air streams. The invention also concerns methods for achieving relatively efficient removal of particulate material from gas flow streams.

RELATED U.S. PATENTS AND APPLICATIONS OWNED BY THE ASSIGNEE

The present application is owned by the Assignee (Donaldson Company, Inc.) of U.S. application Ser. No. 08/062,268 filed Dec. 22, 1994, now U.S. Pat. No. 5,423,892, which is a divisional of Ser. No. 07/897,861 filed Jun. 12, 1992 and issued as U.S. Pat. No. 5,238,474. U.S. Ser. No. 07/897,861 is a continuation-in-part of Ser. No. 07/759,445 filed Sep. 13, 1991, now abandoned, continued as U.S. Ser. No. 08/025,893 on Mar. 3, 1993 and issued as U.S. Pat. No. 5,364,456. U.S. Ser. No. 07/759,445 is a divisional of Ser. No. 07/601,242 filed Oct. 19, 1990 and now issued as U.S. Pat. No. 5,082,476. U.S. Pat. Nos. 5,082,476; 5,238,474; and 5,364,456 are incorporated herein by reference. Many of the principles of these patents can be applied in systems according to the present invention.

BACKGROUND

Air and gas streams often carry particulate material therein. In many instances, it is desirable to remove some or all of the particulate material from the gas flow stream. For example, air intake streams to engines for motorized vehicles or power generation equipment, gas streams directed to gas turbines, and air streams to various combustion furnaces, often include particulate material therein. The particulate material, should it reach the internal workings of the various mechanisms involved, can cause substantial damage. It is therefore preferred to remove the particulate material from the gas flow upstream of the engine, turbine, furnace or other equipment involved.

In other instances, production gases or off gases from industrial processes may contain particulate material therein, for example those generated by the process. Before such gases can be, or should be, discharged through various downstream equipment and/or to the atmosphere, it may be desirable to obtain substantial removal of particulate material from those streams.

A variety of air filter or gas filter arrangements have been developed for particulate removal. For reasons that will be apparent from the following descriptions, improvements have been desired for arrangements developed to serve this purpose.

A general understanding of some of the basic principles and problems of filter design can be understood by consideration of the following types of systems: a paper filter; a pleated paper filter; and, a constant density depth filter. Each of these types of systems is known, and each has been utilized.

Consider first a paper element, comprising a porous paper filter oriented perpendicularly to a gas stream having particulate material entrained therein. The filter paper selected will typically be one permeable to the gas flow, but of sufficiently fine porosity to inhibit the passage of particles no greater than a selected size therethrough. A simple, planar, filter construction made from such a material could in operation be oriented completely across the gas flow stream, for example between a source of air and an intake manifold for an engine. As the gases pass through the filter paper, the upstream side of the filter paper will receive thereagainst selected sized particles in the gas stream. The filter will act to remove the particles from the gas stream. The particles are collected as a dust cake, on the upstream side of the paper filter.

A simple filter design such as that described above is subject to at least two major types of problems. First, a relatively simple flaw, i.e. rupture of the paper, results in complete failure of the system, and thus lack of protection of downstream equipment. Secondly, particulate material will rapidly build up on the upstream side of the filter, as a thin dust cake or layer, eventually substantially occluding the filter to the passage of gas therethrough. Thus, such a filter would be expected to have a relatively short lifetime, if utilized in an arrangement involving in the passage of large amounts of gas therethrough, with substantial amounts of particulate material above the "selected size" therein; "selected size" in this context meaning the size at or above which a particle is stopped by, or collects within, the filter.

The filter lifetime, of course, would be expected to be related to the surface area of the paper filter, the rate of gas flow through the system, and the concentration of particles in the carrier stream. For any given system, the "lifetime" of a filter is typically defined according to a selected limiting pressure drop across the filter. That is, for any given application, the filter will have reached its lifetime of reasonable use when the pressure buildup across the filter has reached some defined level for that application.

An alternative design to that described above is a pleated paper filter. The arrangement of the filter paper in a pleated configuration generally increases the surface area of filter media provided within a given cross-sectional area or volume of space. It will also tend to increase the strength of the system. Thus, the operating lifetime of the filter is increased, due to the increase of surface area for entrainment of particulate material thereagainst. However, pleated paper media is still a surface loaded filter media. As a thin layer of particulate material collects on the upstream surface of the filter element, the filter will still tend to become occluded. Thus, the lifetime of such a filter is still relatively short, in applications. In addition, the system is again subject to significant problems should a minor flaw or rupture develop in the paper element.

It is noted that in many applications, the gas stream to be filtered can be expected to have particulate material of a variety of sizes therein, and/or the equipment can be expected to be subjected to varying gas flow streams with respect to particulate content. Consider, for example, a filter arrangement designed for utilization in motorized vehicles. It will be preferred that the filter arrangements utilized for such vehicles be capable of filtering out particles ranging from submicron sizes up to 100 microns. For example, vehicles utilized in off-road circumstances, at construction sites or at other sites (country roads perhaps) where a lot of dirt is carried in the air, can be expected to encounter gas streams carrying a substantial percent of about 10 to 100 micron material. Most of the air which passes through the air filter of an over-the-highway truck or automobile, when the vehicle does not encounter dust storms or construction sites, generally carries relatively little particulate material above about 5 microns in size, but does carry a substantial portion of submicron to 5 micron sized materials. A city bus, on the other hand, principally encounters only submicron sized carbon particles in the gases passing into the filter thereof. However, even city buses can be expected to at least occasionally encounter air having larger particles therein.

In general, filters designed for vehicles should preferably be capable of providing substantial protection to the engine for particles throughout a size range of submicron to 100 microns, regardless of what are expected to be the preponderant working conditions of any specific vehicle. That is, such arrangements should be developed such that they do not rapidly occlude, under any of a wide variety of conditions likely to be encountered during the lifetime of the vehicle. Such is true, of course, for any filter system. However, with respect to vehicles, the problem is exacerbated by the fact that the vehicle moves from environment to environment, and thus can be expected to encounter a relatively wide variety of conditions. A "flexible" arrangement is preferred at least in part so that one construction of filter can be put to use in a relatively wide variety of applications.

Consider again the paper filter and pleated filter arrangements described above. A paper filter will relatively rapidly occlude, i.e. reach its lifetime through buildup of filter cake and generation of limiting differential. Thus, a given filter paper construction would not be expected to be a very effective system for filtering air under a wide variety of applications, especially with expectation of a relatively long lifetime. In addition, as explained above, paper filter arrangements do not in general provide good protection, in the event of failure. That is, even a minor rupture or tear can result in a nearly complete system failure.

In many applications, an alternative type of filter, generally referred to as a "depth" filter, is available. A typical depth filter is a thick layer or web of fibrous material referred to as "depth media." Depth media is generally defined in terms of its porosity, density or percent solids content. Typically, it is defined in terms of its solids content per unit volume, for example a 2-3% solidity media would be a depth media mat of fibers arranged such that approximately 2-3% of the overall volume comprises the fibrous material (solids), the remainder being air or gas space. Another useful parameter for defining depth media is fiber diameter. If percent solidity is held constant, but fiber diameter is reduced, pore size reduces; i.e. the filter becomes more efficient and will more effectively trap smaller particles.

A typical conventional depth media filter is a deep, relatively constant (or uniform) density, media, i.e. a system in which the solidity of the depth media remains substantially constant throughout its thickness. By "substantially constant" in this context, it is meant that only relatively minor fluctuations in density, if any, are found throughout the depth of the media. Such fluctuations, for example, may result from a slight compression of an outer engaged surface, by a container in which the filter is positioned.

A problem with constant or uniform solidity depth media systems, is that they are not readily adapted for efficient filtering under circumstances in which air or gas flow with varying populations of particle sizes are likely to be encountered. If the percent solidity of the depth media is sufficiently high, relatively large particles will tend to collect in only the outermost or most upstream portions of the media, leading to inefficient utilization of the overall media depth. That is, under such circumstances the particles of solids (especially larger ones) tend to "load" on the front end or upstream end of the media, and do not penetrate very deeply. This leads to premature occlusion or a short lifetime. By "premature" in this context, it is meant that although the depth media volume is large enough for much greater "loading" of solids, occlusion results because the load is heavily biased toward the front end, and results in blockage (and early pressure differential increase).

If, on the other hand, relatively low density depth media is utilized, a greater percent of its volume will tend to be loaded or filled by larger particles, with time. This may occur, for example, through redistribution as particle agglomerates initially formed in more upstream regions, break up and redistribute inwardly. Thus, at the "lifetime" or "limiting pressure differential" load would be more evenly distributed through the media depth (although completely uniform distribution is unlikely). However, very large and very small particles would be more likely to have passed completely through such a system.

From the description, it will be apparent that constant density depth media is not particularly well suited for circumstances in which either: the population of particle sizes within the air flow extends over a relatively wide range; and/or, the air filter is likely to encounter a variety of air streams (conditions) presenting therein a variety of particle size distributions.

Very low density depth media, on the order of about 1-3%, and more typically about 1-2% solidity, is sometimes referred to as "high loft" media. Such media has been utilized as filter media in HVAC filters (heat, ventilation, air conditioning).

The term "load" and variants thereof as used above and referred to herein in this context, refers to amount or location of entrainment or entrapment of particles by the depth media filter.

As explained above, as the density (i.e. percent solidity) of the depth media is increased, under constant load conditions, after use the filter will tend to include a greater load toward the upstream side. Should the load conditions comprise air having a variety of particle sizes therein, or should the filter need to operate under a variety of conditions of use, no single density depth media has, in the past, been as effective as may be desired, as a filter. That is, for any given percent solids depth media, the load pattern will differ depending upon the particle size distribution within the air or gas stream to be filtered. Thus, while the filter depth could be optimized for one particular particle size, it might not be sufficient for operation under a variety of conditions or with gas having a variety of particle sizes therein.

SUMMARY OF THE INVENTION

According to the present invention, an air filter arrangement is provided. The air filter arrangement generally includes a first filter construction having filter media with an upstream side; and, a removable and replaceable filter of depth media operationally positioned in covering relation to the first filter construction upstream side. In a preferred embodiment shown, the first filter construction is an inner filter construction and the arrangement is configured with the filter media of the inner filter being received within the removable and replaceable filter. In this preferred embodiment, preferably the removable and replaceable filter is a sleeve filter. In this and similar contexts, the term "operationally" is meant to refer to orientation for operation in ordinary use, to filter.

In certain preferred applications, the removable and replaceable filter includes more than one layer of depth media therein. In preferred configurations, the removable and replaceable filter is substantially cylindrical and includes a first open end for insertion of the inner filter construction therein, and a second end with an end skirt at least partially enclosing the second end. The end skirt may comprise a heat formed ring of flexible polymeric material.

Preferably the sleeve filter comprises a compressible sleeve of depth media having a cylindrical configuration and sufficient elasticity and memory to rebound to its cylindrical configuration when folded or deformed from cylindrical, under light hand pressure. By this it is not meant that the arrangement necessarily cannot be irreversibly deformed by hand, but rather that under hand pressure the arrangement can be easily squeezed, collapsed or rolled in such a manner that it will spring back from that, to re-form the cylindrical sleeve. Such arrangements will be particularly convenient for handling, storage and shipping.

In certain embodiments, preferably the inner filter comprises a pleated paper filter. It may preferably comprise oil pleated paper.

In those arrangements wherein the inner filter comprises a pleated paper filter, preferably the inner filter includes an outer liner immediately upstream from the pleated paper filter. The outer liner may comprise a variety of materials, for example polymeric scrim or a rigid porous metal liner.

In certain preferred arrangements, the inner filter includes an open end cap and a closed end cap. In those embodiments wherein the removable and replaceable filter is a sleeve which fits over the inner filter, and the inner filter includes an open end cap and a closed end cap, it will generally be preferred that the closed end cap is formed from a relatively hard, smooth material which will present a relatively low coefficient of friction or resistance to the sleeve filter sliding thereover. A preferred material for this end cap is a hard urethane material having a hardness of at least about 30 Shore D, or a similar hard, smooth, plastic such as plastisol.

The open end cap, in typical arrangements such as those shown in the drawings, is not necessarily subject to the preference for the low coefficient of friction with the sleeve filter, since no substantial length of the sleeve filter has to slide past the open end cap in use. Indeed, it may be preferred to make the open end cap from a relatively soft polymeric material, if a radial seal arrangement is desired. When such is the case, preferably the soft polymeric material is a polyurethane foam, and the first end cap includes means for forming a radial seal with the housing.

A preferred configuration for an annular rim of the open end cap is provided. The configuration includes a seal ramp and sealing shoulder, to advantage.

In certain applications of the present invention, an overall air filter arrangement including a housing is provided. The housing in certain preferred applications is configured so that the sleeve can be removed and replaced, without dismounting the inner filter from the arrangement. This can be accomplished, for example, with the housing having an end cover oriented in covering relation to an end skirt of the sleeve filter. The housing may comprise a variety of materials, for example sheet metal or plastic.

Also according to the present invention, a removable and replaceable filter, for use in air filter assemblies according to the present invention, is provided. Further, methods of filtering air, to advantage, are provided.

In one embodiment described herein, the arrangement includes an outer rigid filter and a removable and replaceable inner filter element, of depth media. Preferably the inner filter element of depth media comprises more than one layer of depth media, most preferably with a gradient for filtering efficiency therein. Preferably the inner filter element is readily collapsible under hand pressure, and is of a material which can readily reform its uncollapsed configuration, when the hand pressure is released.

In the drawings, relative component sizes and thicknesses may be shown exaggerated, for clarity.

BRIEF DESCRIPTION OF THE DRAWINGS

FIG. 2 being taken along line 2—2 thereof.

FIG. 6 being taken along line 6—6 thereof.

FIG. 7 is a bottom end view of the arrangement shown in FIG. 5.

FIG. 8 is a fragmentary view of an air filter arrangement incorporating components according to the present invention; FIG. 8 including portions broken away and depicted in cross-section, to show internal detail.

DETAILED DESCRIPTION OF THE INVENTION

Figure 1:
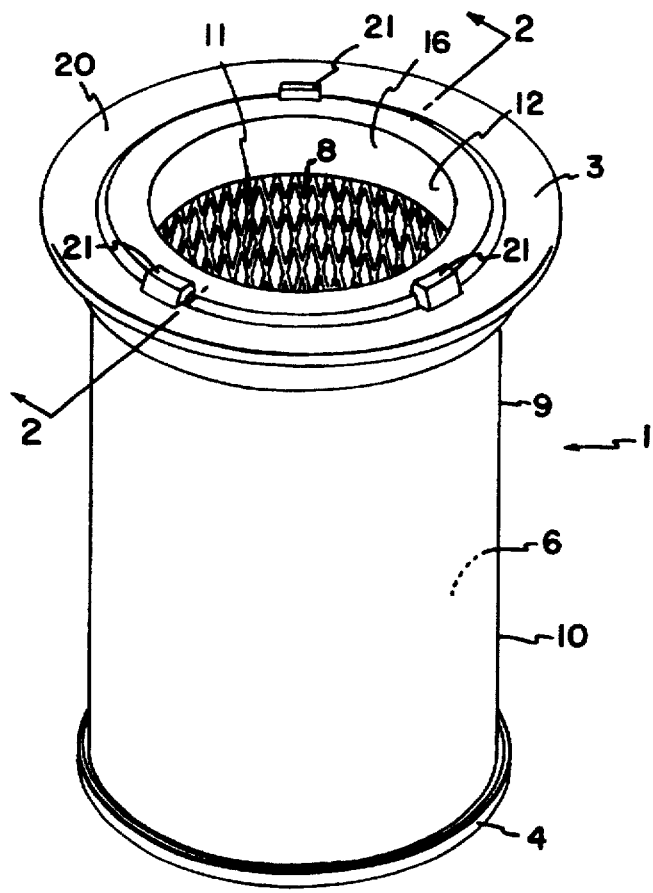
FIG. 1 is perspective view of an internal filter element according to the present invention, and usable in certain assemblies according to the present invention.

Brief Characterization of Related Disclosures Owned by the Present Assignee

Attention is directed to U.S. Pat. Nos. 5,238,474; 5,082,476; and 5,364,456, the disclosures of which are incorporated herein by reference. These patents issued to the assignee of the present invention, Donaldson Company, Inc. of Minneapolis, Minn. In these patents, arrangements were described in which both depth media and pleated paper media were utilized in the same construction. In the examples provided, the filter elements included end caps having a pleated paper element extending therebetween. In some variations, for example FIG. 10 of U.S. Pat. No. 5,238,474, a removable upstream region of depth media was shown around the filter element. Arrangements including more than one layer of depth media, with preferred gradients in filtering efficiency, were shown.

Some Concerns with Conventional Filters

Some of the advantages of arrangements according to the present invention will be understood by consideration of conventional filter arrangements and arrangements described herein, when used as truck engine air filters. It will be understood, however, that applications of arrangements and principles according to the present invention, may be in a wide variety of equipment or engine uses, not just with trucks.

In general, truck air filter arrangements include filter elements that periodically are changed. In general, an air filter arrangement has reached its design lifetime, when a (design) limiting pressure drop across the filter media is reached. During use, as particulate material loads on the filter, the filter increasingly resists gas flow thereacross. That is, the pressure drop across the filter tends to increase. For any specific application, the "limiting" pressure drop will the point at which the filter needs to be, or should be, changed. For example, if the filter is being used as an air filter for an intake manifold of a truck, a pressure drop of about 20–30 inches of water will typically be the limiting pressure drop. For an automobile, typically about 20–25 inches of water will be the limiting pressure drop. In industrial ventilation systems, typically about 3 inches of water is the limiting pressure drop; and, for gas turbines, typically about 5 inches of water will be the limiting pressure drop. In some industries or applications, limiting pressure drops are set in specifications applicable to the system, or through regulatory control.

In practice, the pressure drop is not always measured and replacement of the filter element does not always occur only when a designated (design) pressure drop is reached. For example, the majority of truck engine filters are probably serviced on a regularly scheduled basis, typically defined by mileage, such as every 30,000 miles or every 40,000 miles. This means that the filter element may be removed and disposed of long before its useful life has been expended. It is estimated that, on the average, more than one-half of filter element life in trucks is lost by premature but scheduled servicing.

The consequences of premature servicing extend far beyond mere cost in dollars of lost filter life. Conventional truck engine filters contain significant amounts of raw material, including structural metal components, end cap materials, gaskets, and filtration media. There are concerns with the impact of disposing these items in landfill, and it would be preferred to extend lifetime and limit frequency of disposal. Further, even if the filter elements have been used to their useful life, there may still be portions of them which would be functional and usable, but for the fact that they are inseparably incorporated into a system which includes "loaded" media.

Another problem with conventional systems, especially those which have no internal safety filter, i.e. trucks for city use or long haul over-the-highway trucks, is that as the filter element is being replaced, the clean air plenum or intake is exposed to the environment. Thus, dirt or other matter can fall into the open air intake, and cause internal damage to the engine.

Also, premature filter servicing wastes labor hours involved in removing the used elements, cleaning the air cleaner housings, and installing the new filters.

Further, it is generally known that "new" filters pass more particulates than filters which have been in place for a period of time. This is because the particulates that are eventually "loaded" into the filter in use, facilitate the efficiency of the filtering process. Thus, it is not desirable to replace partially loaded filter elements prematurely, if possible, since they may be at a point in their lifetime when they are operating more efficiently as a filter than when they are replaced with new elements.

Figure 2:
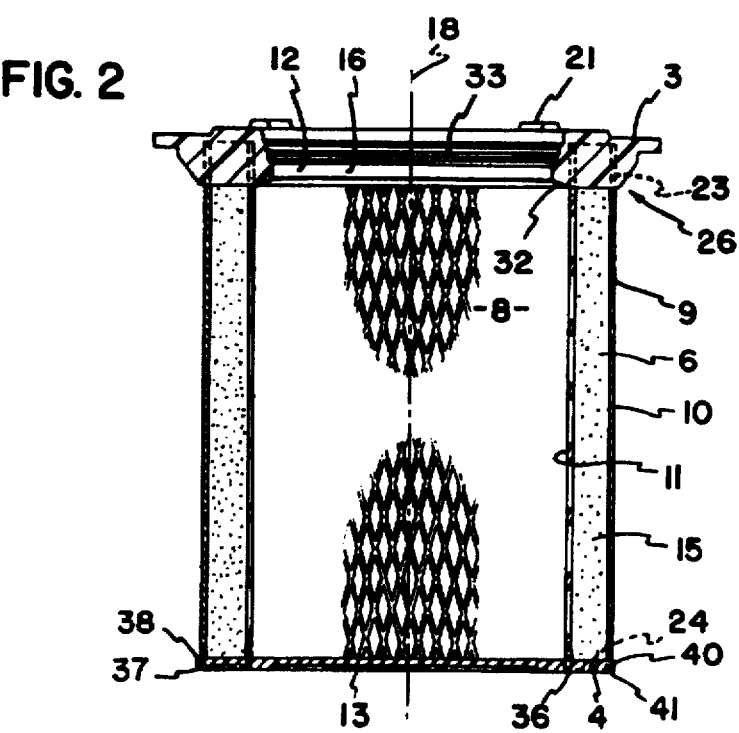
FIG. 2 is a cross-sectional view of the arrangement shown in FIG. 1.
Figure 3:
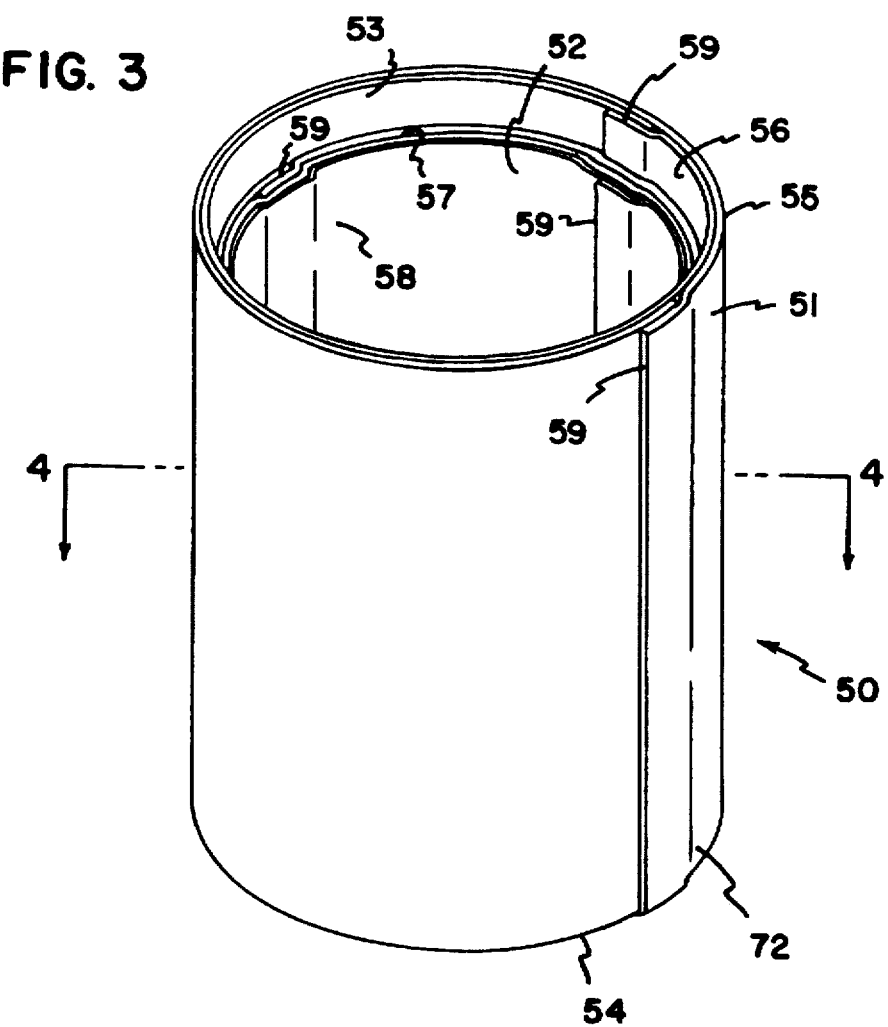
FIG. 3 is a perspective view of a sleeve component according to the present invention; the sleeve component of FIG. 3 being usable in certain overall arrangements or assemblies according to the present invention.
Figure 4:
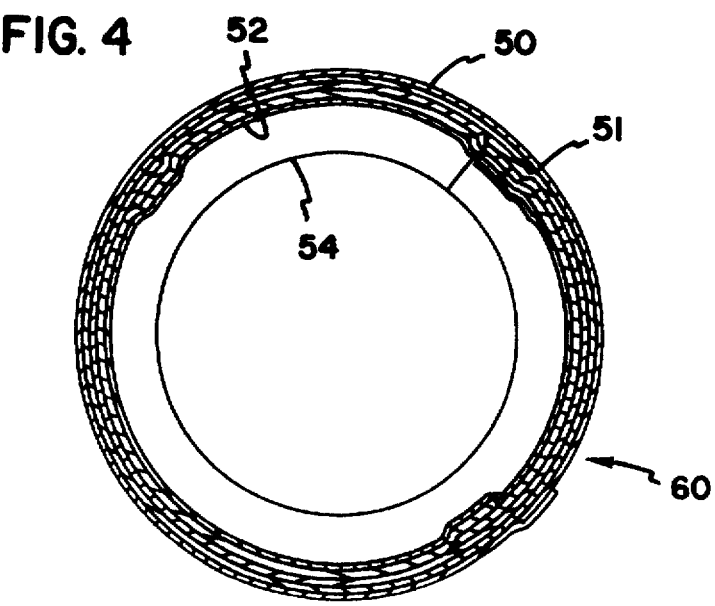
FIG. 4 is a cross-sectional view taken generally along line 4—4, FIG. 3.
Figure 5:
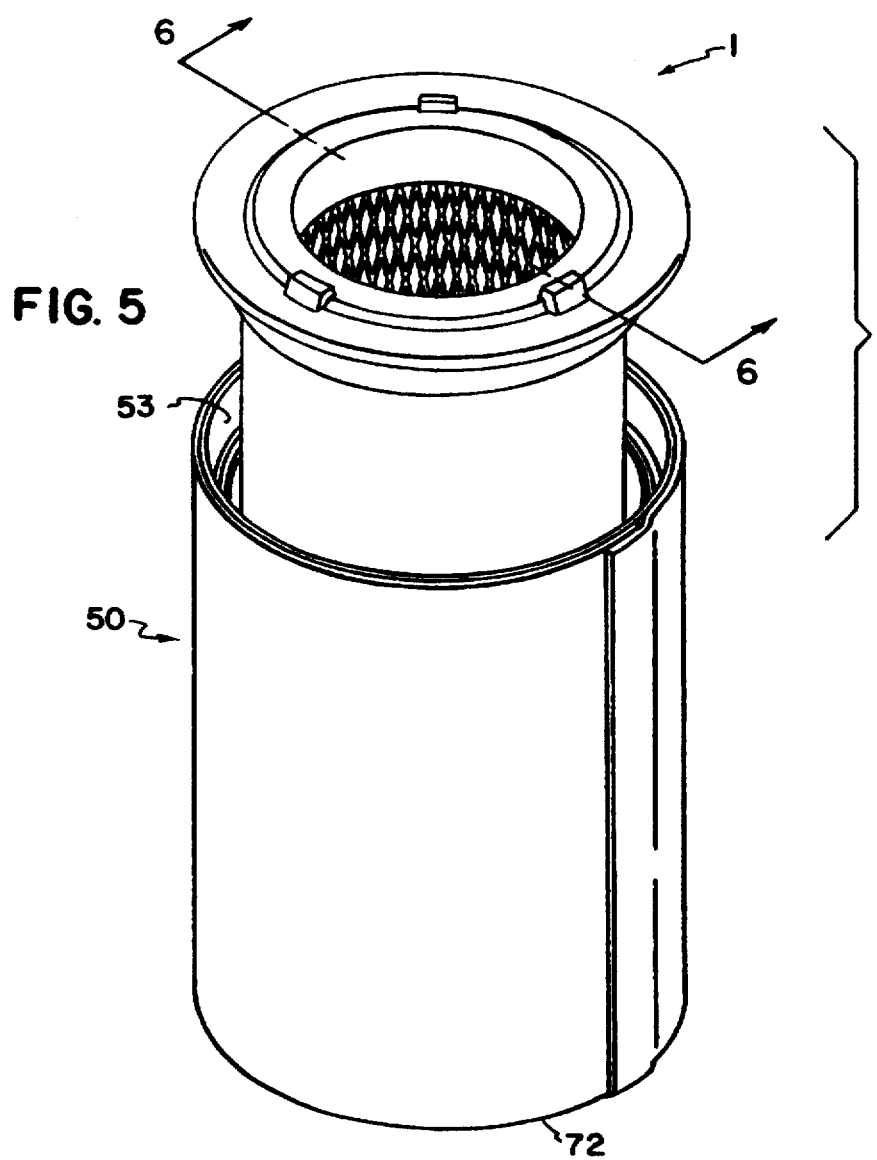
FIG. 5 is an exploded perspective view of an assembly of the internal element of FIG. 1 and the sleeve of FIG. 3.
Figure 6:
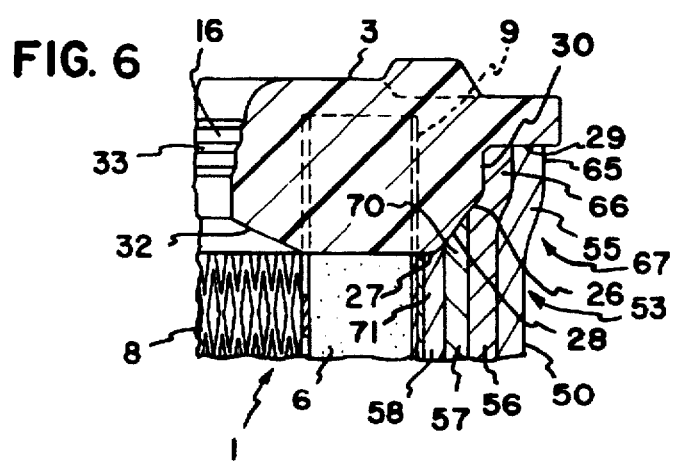
FIG. 6 is a fragmentary cross-sectional view of the arrangement shown in FIG. 5.

Detailed Description of the Drawings An arrangement according to the present invention is depicted in FIGS. 1–8. In FIG. 8, the filter element is depicted fully assembled, in an air cleaning arrangement or apparatus. The filter element of preferred arrangements according to this embodiment of the present invention comprises two components. These are a first (for the embodiment shown in FIGS. 1–8, internal) typically end-capped, filter; and, an upstream (for the embodiment shown in FIGS. 1–8, external or outer) removable and replaceable filter (for the preferred embodiment shown, a sleeve filter). In FIGS. 1 and 2 an internal or safety element is shown. In FIGS. 3 and 4, the removable and replaceable filter sleeve, which operates as a primary filter element, is depicted. In FIGS. 5–7, an assembled filter element, comprising the internal element and the removable and replaceable sleeve, is shown. In this context, the term "removable and replaceable" is meant to refer to a filter media containing component that can be removed from the remainder of the filter element and be replaced. That is, in this context the term is not used in reference to the fact that, of course, the entire filter element (comprising both the sleeve and the safety element) can be removed from an air cleaner and be replaced. Rather, it is used to describe the separability of the upstream filter component (for example the sleeve) from the downstream filter component (for example the inner filter).

Referring to FIG. 1, the reference numeral 1 generally designates a preferred internal filter element or cartridge, according to the present invention. The internal element 1 is rigid and includes first and second opposite end caps 3 and 4, with filter media 6 extending therebetween. In the arrangement shown, internal element 1 includes an inner liner 8 and an outer surface or liner 9. A variety of materials may be utilized for the inner and outer liners 8 and 9. For the particular arrangement shown, the inner liner 8 comprises a porous metal liner or expanded metal liner, and the outer liner 9 comprises scrim 10, i.e. a fibrous web of material.

Still referring to FIG. 1, for the particular arrangement shown, internal element or cartridge 1 comprises a generally cylindrical construction defining an inner or internal chamber or bore 11 with opposite ends. End cap 3 is an open end cap, and thus includes bore 12 for air flow communication from internal bore 11.

In contrast to end cap 3, in the particular embodiment depicted, end cap 4 is a closed end cap (FIG. 2). That is, it does not include a bore therein, rather it provides a closed end or cover 13 over an end of bore 11.

For the particular arrangement shown in FIG. 1, filter media 6 comprises pleated paper media 15 arranged in a cylindrical pattern and with the pleats aligned longitudinally. In some embodiments, the preferred pleated paper media 15 is an oiled media. In many applications a relatively short pleat depth, for example about 0.375 to 0.81 inches, may be used. Media 6 may include alternate media or additional media, to (oiled) pleated paper. It may include, for example, depth media and/or an agglomerating filter.

The particular internal element or cartridge 1 depicted is a "radial seal" cartridge. This will be understood from consideration of FIG. 8, described below. In general, this means that element 1 is sealed, with an air intake conduit of an engine, by radial engagement along surface 16 in end cap 3. By "radial", in this context, it is meant that the compressive forces for sealing are directed radially about a longitudinal axis 18 of element 1, rather than axially (axially being in the direction of extension of longitudinal axis 18). Features according to the present invention may be utilized in axially sealing systems. However, it is an advantage of arrangements according to the present invention that they can be readily incorporated in, and used in, radial sealing systems. Radially sealing systems are disclosed, for example, in U.S. Pat. No. 4,720,292, the disclosure of which is incorporated herein by reference.

Still referring to FIG. 1, outer surface 20 of end cap 3 may be featureless, or may include thereon various features to facilitate assembly. For the particular arrangement shown, surface 20 includes projections or bumpers 21. These may be used to facilitate assembly and maintenance of a desired position within a housing, FIG. 8. Alternatively, or in addition, surface 20 may include axial seal rings or beads thereon.

For the arrangement of FIGS. 1–8, the preferred end cap material for forming end cap 3 in inner element 1, when a radial seal arrangement is involved, includes the following preferred polyurethane, processed to an end product (soft urethane foam) having an "as molded" density of 14–22 pounds per cubic foot (lbs/ft$^3$) and which exhibits a softness such that a 25% deflection requires about a 10 psi pressure. The preferred polyurethane comprises a material made with I35453R resin and I3050U isocyanate. The materials should be mixed in a mix ratio of 100 parts I35453 resin to 36.2 parts I3050U isocyanate (by weight). The specific gravity of the resin is 1.04 (8.7 lbs/gallon) and for the isocyanate it is 1.20 (10 lbs/gallon). The materials are typically mixed with a high dynamic shear mixer. The component temperatures should be 70°–95° F. The mold temperatures should be 115°–135° F.

The resin material I35453R has the following description:
   (a) Average molecular weight
      1) Base polyether polyol=500–15,000
      2) Diols=60–10,000
      3) Triols=500–15,000
   (b) Average functionality
      1) total system=1.5–3.2
   (c) Hydroxyl number
      1) total systems=100–300
   (d) Catalysts
      1) amine=Air Products 0.1–3.0 PPH
      2) tin=Witco 0.01–0.5 PPH
   (e) Surfactants
      1) total system=0.1–2.0 PPH
   (f) Water
      1) total system=0.03–3.0 PPH
   (g) Pigments/dyes
      1) total system=1–5% carbon black
   (h) Blowing agent
      1) 0.1–6.0% HFC 134A.

The I3050U isocyanate description is as follows:
   (a) NCO content—22.4–23.4 wt %
   (b) Viscosity, cps at 25° C.=600–800
   (c) Density=1.21 g/cm$^3$ at 25° C.
   (d) Initial boiling pt.—190° C. at 5 mm Hg
   (e) Vapor pressure=0.0002 Hg at 25° C.
   (f) Appearance—colorless liquid
   (g) Flash point (Densky-Martins closed cup)=200° C.

The materials I35453R and I3050U are available from BASF Corporation, Wyandotte, Mich. 48192.

The material from which end cap 4 is formed is preferably a different material than the soft polyurethane material used in end cap 3, when end cap 3 is formed from a soft polyurethane foam for use in generating a radially sealing element. A reason for this is that relatively soft polyurethane foam typically has a rubbery surface texture which generates a relatively high coefficient of friction with respect to sliding other materials thereacross. In certain preferred arrangements of the invention, as described hereinbelow, the outer filter is a sleeve filter which slides snugly over end cap 4, during assembly. It would be preferred that the coefficient of friction between the end cap 4 and the sleeve element be relatively low. This can be facilitated by avoiding use of a soft polyurethane foam material for end cap 4.

Preferably, the material from which end cap 4 is formed is a relatively hard, smooth material. If it is a polymeric material, preferably it is a hard polyurethane. Polyurethanes formed from commercially available WUC 36081R (resin) and I3050U (isocyanate), both available from BASF, can be used for this end cap. Thus, certain preferred arrangements according to the present invention have a relatively unique construction wherein different materials are utilized for the opposite end caps, to advantage. It will be understood that preferably in each instance, the material is one which can be molded with the filter material 6 of the internal element 1 potted or embedded therein, and extending between the two end caps 3 and 4.

In general, the use of scrim 10, rather than an expanded metal construction, for liner 9 will also facilitate assembly. Expanded metal liners include burrs which may tend to catch on media sliding thereacross.

Attention is now directed to FIG. 2, in which the arrangement of FIG. 1 is shown in cross section. From FIG. 2, it will be understood that filter media 6 includes opposite ends 23 and 24, embedded in end caps 3 and 4, respectively. Further, liners 8 and 9 include opposite ends, also embedded in end caps 3 and 4.

End cap 3 includes an outer annular surface 26 with various features thereon and shoulder 27. In particular, and referring to FIG. 6, surface 26 includes particular, and referring to FIG. 6, surface 26 includes beveled region or sealing ramp 28, and second outer (axial) shoulder 29. Surface 26 further includes annular surface 30, between beveled region 28 and second shoulder 29. In this context the term "axial" refers to a shoulder oriented to be abutted by an item under a force directed along, i.e. in the direction of, axis 18.

The features of outer annular surface 26 facilitate engagement with the outer, removable and replaceable, sleeve filter. This will be understood from the descriptions below with respect to FIGS. 5, 6 and 7.

Referring again to FIG. 2, end cap 3 further includes inner compressible ring 32 occupying a volume between surface 16 and a portion of inner liner 8. Ring 32 is appropriately sized and configured to generate a desirable radial seal. Surface 16 is preferably stepped, as shown at 33, to facilitate sealing.

Attention is now directed to end cap 4, FIG. 2. End cap 4 generally includes an outer surface 35 including peripheral ring 36. The end cap 4 further includes annular ring 37. For the particular embodiment depicted, surface 38 of annular ring 37 is generally featureless except for inner shoulder 40, rounded outer shoulder 41 (and any standoffs, not shown, resulting from the molding process). Advantages from these features will be apparent from the descriptions with respect to FIGS. 5–7.

Attention is now directed to FIGS. 3–5. Reference numeral 50, FIG. 3, generally designates an outer, removable and replaceable, sleeve filter sized and configured to be positioned over internal element or cartridge 1, in use. With the particular arrangement shown, outer sleeve 50 includes generally cylindrical outer surface 51, internal bore 52, insert end 53, and radial end flange or end skirt 54.

Still referring to FIG. 3, the particular sleeve 50 depicted, comprises four layers 55, 56, 57 and 58 of depth media. As will be understood from descriptions hereinbelow, variations in the number of layers can be used. The particular layers 55, 56, 57 and 58 shown provide for a preferred gradient in efficiency for trapping particles. Each of layers 55, 56, 57 and 58 comprises a generally cylindrically wrapped sheet of depth media. In FIG. 3, a seam 59 is depicted in each layer. Attachment at seams 59 can be provided by a contact adhesive such as 3M Super 77 (available from 3M Company, St. Paul, Minn.). Alternatively, or in addition, heat sealing may be used.

Referring to FIGS. 5, 6 and 7, in use, the particular outer sleeve 50 shown is slid over internal element 1 (i.e. through insert end 53), preferably until end skirt 54 approaches (and preferably even abuts) surface 35 of end cap 4, FIG. 7. Thus, in use, filter media 6 of internal element 1 will be positioned within internal bore 52 of outer sleeve 50, and will be overlapped (upstream) by all layers of depth media in sleeve 50, i.e. layers 55, 56, 57 and 58.

For the particular arrangement shown in the drawings, no separate mechanical attachment mechanism is used to secure outer sleeve 50 in position over internal element 1 other than a relatively snug fit. In general, it is foreseen that the outer layer(s) of sleeve 50 that slide over ramp 28 to abut shoulder 29 will be made from flexible fibrous material having sufficient elasticity and memory, to ensure a snug engagement when stretched over surface 30, FIG. 6. Indeed, typically outer sleeve 50 will comprise, at least in outer layers thereof, cylindrically configured fibrous depth media, which possesses such properties.

Referring to FIG. 4 for the preferred embodiment shown, as previously indicated, outer sleeve 50 comprises a multi-layer depth media arrangement 60. The particular sleeve 50 shown includes outer layer 55 and three inner layers 56, 57 and 58. Variations in fiber diameter, density and/or thickness between or among the various layers can be used to provide preferred loading characteristics, filter efficiency and filter performance. Indeed, variations in the number of layers can be used. Principles related to this are provided hereinbelow.

Attention is now directed to FIG. 6, which shows outer sleeve 50 mounted on internal element 1, in cross-section. Attention is focused on the portion of the drawing whereat insert end 53 of outer sleeve 50 is shown engaging end cap 3 of internal element 1. In particular, ends 65 and 66 of the outer two layers 55 and 56 (in sleeve 50) are expanded over beveled ramp 28 in end cap 3 and sit against outer shoulder 29 and outer annular surface 30. Thus, ends 65 and 66 include an expanded (internal) diameter portion 67 sized and configured for an interference fit engagement with annular surface 30. It is noted that for typical applications, it will not be necessary to further seal the engagement between end cap 3 and outer sleeve 50 at this location, since a snug fit between the two will generally be enough, given the protection afforded by filter media 6. In general, what is preferred is a sufficient interference fit to keep sleeve 50 snugly fit against end cap 3, so that air passing therebetween, and not obtaining the benefit of passage through some of the depth media, is held to a minimum, or at least to below an undesirable level. In general, it is believed this can be accomplished if the outer layer(s) of media, which is (are) expanded over ramp 28 is (are) made from a stretchable polymeric material, such as air laid polyester fiber materials, and is (are) expanded at least about 1% in circumference or diameter, when slid over the ramp 28. The minimum figure of 1% is believed sufficient for typical truck installations, which will involve designs wherein the end cap 3 outer diameter at surface 30 is about 4.5 to 13 inches.

Attention is now directed to inner layers 57 and 58, FIG. 6. In particular, attention is directed to ends 70 and 71 of inner layers 57 and 58. Ends 70 and 71 are not long enough to stretch over ramp 28. Thus, ends 70 and 71 are not stretched or expanded substantially. Indeed, in some instances, since layers 57 and 58 are similarly positioned layers, and do not need to expand substantially in use, they may be made from a material, or may have scrim attached to them, which is relatively non-expandable. This will be further understood from descriptions given below. In general, a layer of scrim along the inside diameter of innermost layer 58 will be preferred, to facilitate slip between the sleeve 50 and inner element 1, during assembly and disassembly.

Attention is now directed to end skirt 54, FIG. 7. In general, end skirt 54 comprises a ring at end 72 of outer sleeve 50. For the embodiment shown, end skirt 54 is positioned to be pressed against end cap 4, when outer sleeve 50 has been properly positioned on internal element 1. Generally, end skirt 54 will comprise a skirt of the same fibrous material from which at least outer layers 55 and 56 are formed, except melted and collapsed (crushed). A procedure for this is described below in association with FIG. 11.

Attention is now directed to FIG. 8. Reference numeral 80, FIG. 8, generally designates an assembled air filter arrangement according to the present invention. In FIG. 8, portions are broken away to show internal detail. The air filter arrangement 80 of FIG. 8 is a "normal" or "forward" flow arrangement. That is, in normal operation flow of air to be filtered is shown in the direction of arrows 81; i.e. through the filter media from the outside in.

In general, air filter arrangement 80 includes housing 83; downstream, internal, element 1; and, upstream outer sleeve 50. Housing 83 includes outer wall 84, inlet 85, cover 86 and outlet tube 87. For the arrangement shown, cover 86 is generally openable, and in fact is removable and replaceable from outer wall 84, for access to the internally received internal element 1 and outer sleeve 50. In general, engagement between cover 86 and a remainder of housing 83 is provided by bolts 90. Preferably the arrangement is sized so that cover 86 will press skirt 54 against internal element 1. This will help secure sleeve 50 in position and provide the non-critical seal between sleeve 50 and end cap 3.

Outer wall 84 defines a space 92 around outer sleeve 50 so that air to be filtered can pass efficiently into outer sleeve 50 throughout its circumference.

In general, outlet tube 87 includes inner section 95 with rim 96. Rim 96 is preferably circular and of an appropriate diameter so that, when inserted within bore 12 of end cap 3, a radial seal (at 98) with surface 16 will be formed. Arrangements suitable for accommodating this are described, for example, in U.S. Pat. No. 4,720,292, incorporated herein by reference. In general, at least about 20–25% compression of some of the material in ring 32, between and against surface 16 and liner 8, will be preferred, for a good radial seal.

For typical radial sealing arrangements such as the one shown in FIG. 8, the internal length of housing 83, i.e. the distance between surface 100 and cover 86, need not necessarily be designed to apply substantial axial forces to the various portions of the elements received therein. This is because the radial seal provides for sealing, and axial forces are not essential to its maintenance. Some axial compression, however, may be desired in such radial seal systems to provide protection against leaks developing as the arrangement is bounced or jostled in use. Indeed in some systems involving radial seals, even auxiliary axial seal rings may be desirable.

From a review of FIG. 8, preferred operation will be readily understood. In general, air passing into inlet 85 is dispersed in space 92, and passes through outer sleeve 50 in the direction of arrow 81. Much of the particulate material, carried within the air, will be deposited within the depth media of filter 50. The air then passes through internal element 1. Any particulate material to be removed from the air flow stream but not removed from the outer sleeve 50 will generally be removed by the internal element 1. The clean air then passes through inner liner 8 and into internal bore 11. It is then passed outwardly from the air filter arrangement 80 through outlet tube 87, and into the air intake of the engine.

When it has been determined that outer sleeve 50 is to be changed, for example at periodic maintenance or under circumstances in which a measured level of pressure differential across the filter element has been reached, maintenance is relatively straightforward. End cover 86 is opened, by operation of bolts 90. Outer sleeve 50 can then be readily slid off internal element 1. Indeed, if desired, for the particular arrangement depicted sleeve 50 can be slid over end cap 4 and removed without breaking the radial seal between internal element 1 and outlet tube 87. A new sleeve can be readily positioned over internal element 1. After replacement of the cover 86, the air filter arrangement 80 is generally ready to be placed back in use. The used outer sleeve can be discarded. (It is noted that the inner element 1 can be changed by an analogous procedure.)

For a review of the particular arrangement in FIGS. 1–8, numerous advantages to some of the possible embodiments of the present invention are apparent. For example, the particular outer sleeve 50 depicted, does not comprise rigid structural features (such as metal, rubber or hard plastic), but rather it only comprises flexible depth media material and flexible fibrous scrim. Since it does not contain rigid end caps, metal structural elements, etc. it can be very easily collapsed and discarded. Also, much of the spent material is void (except for dust loading), so it does not contribute as substantially to landfill, as many previous arrangements. Further, new sleeves, i.e. replacement sleeves, can be shipped and stored in a "collapsed" configuration; i.e. squeezed or rolled. This provides space saving advantages.

From the description provided above with respect to FIG. 8, it is apparent that it is possible to substantially regenerate the filter element of the particular embodiment depicted, without removing internal element 1 from the system. Thus, it is not necessary to expose the clean air plenum downstream from the filter arrangement to the environment and possible contamination by dust or dirt. Further, certain structural features such as the pleated paper filter, the internal liner, and the end caps are not replaced simply because the upstream depth media is substantially loaded. Rather they remain in place, and it is only the depth media in outer sleeve 50 which is relatively frequently changed. This facilitates disposal of parts, and reduces waste present in conventional designs. For example, the outer sleeve 50 might be designed to be replaced every 30,000 miles, with the inner filter 1 replaced only every 300,000 miles.

Further, from the description it will be apparent that the maintenance operation is relatively simple and straightforward, and thus easier to effect.

From a review of FIG. 8, it will be seen that in selected embodiments, advantageous use may be made of certain principles according to the present invention, with respect to materials and material use. End cap 4 may have a smaller diameter than an analogously positioned end cap in prior constructions, since the outside diameter of the end cap does not extend substantially beyond the outside diameter of the inner pleated paper material. Indeed, preferably it does not extend more than about 0.125 inches beyond the outer liner 9, so that minimal spacing, if any, between the inside layer 58 of the outer sleeve 50, and the liner 9 is involved. As a result of having a smaller outside diameter, less material is sometimes needed for forming end cap 4, relative to conventional systems. This can be used to achieve material savings and process advantages. In some instances, a weight savings, at least for the rigid portions of the filter element, can be made as well.

Selection of Media Characteristics; Principles of Operation

Flexibility obtainable with designs according to the present invention allows for advantageous application to accommodate filtering needs in a wide variety of environments. For example, the outer sleeve 50 can be designed to comprise only one type of depth media, more than one type of depth media, preferred gradient density arrangements, etc. Different sleeve elements can be designed for the very same air filter arrangement and equipment, with the choice for use being dependent upon the expected operating conditions. Indeed, alternate sleeves can be used depending upon the particular environment to which the equipment will be exposed; and, the filter sleeve can be changed when the environment changes, if desired. Also, different geometric configurations may be used. For example, the inner filter might have a circular cross-section while the outer sleeve has an oval cross-section.

In general, attention is directed to U.S. Pat. Nos. 5,238,474, 5,364,456 and 5,082,476, with respect to selection of media. Similar principles to those outlined in these references can be applied with systems according to the present invention.

For example, as explained above, uniform or constant density depth media can be used in outer sleeve 50. However, improvement over the utilization of constant density depth media can be obtained in many arrangements, through the utilization of a gradient depth media filter system, in outer sleeve 50; that is, an arrangement wherein the depth media of outer sleeve 50 is not provided with a constant capability (efficiency) to trap or load solids throughout. This can be done by utilizing a multi-layer arrangement, such as shown in FIGS. 3 and 4, in which depth media in at least some of the various layers is selected to be different. It may alternatively (or in addition) be accomplished by using the same media in more than one layer but varying the amount of compression the media is under, thereby changing its installed (rather than free state) solidity.

A preferred gradient depth media system, for the removable and replaceable upstream filter member, is one in which the efficiency or ability to trap particles (especially smaller ones) in general increases from an upstream side toward a downstream side. In typical applications, the efficiency of the depth media is increased by providing an increasing density (percent solids) gradient. It may also (or alternatively) be accomplished through decreasing fiber size, varying depth media thickness, varying compression or with a combination of these techniques. By "increase" in "efficiency" or "ability to trap particles" in this context, it is not meant that the downstream layer necessarily does collect more particles, in use. Rather it is meant that, if the two layers were tested separately (but in the form and compression they have in the arrangement), under exposure to test streams of dust containing small particles (less than about 5 microns), the material which forms the more upstream layer of the two would generally show less efficiency of trapping.

than the material which forms the inner layer. Alternately stated, the innermost of the layers being compared is constructed and arranged to more efficiently trap smaller particles.

From the above, some variations in filter design according to the present invention will be apparent. For example, the preferred design will be such that much of the dust loading will occur in the removable and replaceable sleeve 50; indeed typically the system will be designed so that the great majority of dust loading (by wt-%) occurs here. That is, in typical use, for preferred embodiments there will be relatively little dirt, dust or particulate loading on or in the inner filter 1, in use. Designs can be made to emphasize this. In such arrangements, the inner filter will generally operate as a safety filter and as a structure to hold the depth media of the outer sleeve 50 in place, and resist collapse. This latter is facilitated by the fact that the inner filter includes rigid structural components that can withstand pressure, typically a design limit of at least 100 inches of water; whereas for typical preferred embodiments described herein the outer sleeve is a more easily compressible sleeve.

In many preferred arrangements according to the present invention, the upstream removable and replaceable (for example sleeve) filter will be designed to operationally collect at least 90% by weight (and in some instances 95% or more) of the particulates collected in use. By "operationally collect" in this context it is meant that if the arrangement were examined after a substantial period of typical use (for example 20,000 miles in an over-the-highway truck or city delivery truck), at least 90% (or in some systems at least 95%) of the particulates (by wt.) loaded on the entire system would be found in the removable and replaceable (sleeve) filter.

The material chosen for the depth media in the outer sleeve 50 can be chosen based upon various needs or design criteria. For example, it might be selected to be a good storage or loading media. Alternatively, or in addition, a layer may be chosen to operate as a good agglomerating filter. An agglomerating filter is a material which facilitates particle agglomeration thereon, and from which the agglomerated particles may eventually be released to settle into inner layers or filter members. More specifically, an agglomerating filter media has large interfiber dimensions relative to the fiber size and particles being filtered. As particles are collected and built up on the fibers, they are unable to bridge the interfiber spaces. These groups of particles may be shed or dislodged from the fibers as agglomerates under the influence of fluid drag forces or impact of incoming particles. The specific dimensions of good agglomerating media depend on the size distributions of the particles being filtered and existing flow conditions.

As indicated above, a variety of materials can be utilized for forming the outer layer or liner 9 of inner element 1. As previously indicated, a scrim 10 can be used, bonded to the tip of each pleat. For example, a polyester scrim with a hot melt scrim immediately adjacent can be applied to the pleat tips, with heat. Such a polyester scrim will generally, once in place, help secure the pleat tips in position and avoid undesirable movement in use. This can be readily accommodated by a scrim which is only about 0.004–0.010 inch thick.

Preferred scrim comprises polyester (for example spunbonded) fabrics or polypropylene fabrics. Such scrim materials are available from Reemay Corporation of Old Hickory, Tenn. 37138, under the trade name REEMAY 2011. For the hot melt scrim, applied with the polyester scrim, Bostik 2215, available from Bostik, Middleton, Mass. 01949, can be used. An advantage to such materials is that they are smooth and free from undesirable burrs, unlike metal liners.

In some arrangements it may be preferred to utilize, as the scrim, fibrous material having a microfiber applied thereto. This generates a microfiltration medium, that can operate as a "polishing" filter to advantage. Techniques for applying polymeric microfibers to substrates are described in U.S. Pat. No. 4,650,506 issued to Donaldson Company, Inc. of Minneapolis, Minn. and incorporated herein by reference. Alternatively glass microfibers might be used. The particular techniques utilized for applying the microfibers to the substrate are not believed critical to, or essential to, obtaining many of the advantages according to the present invention.

With respect to the scrim 10, techniques described in the U.S. application entitled "PLEATED FILTER AND A METHOD FOR MAKING THE SAME" filed on the same day as the present application, owned by the Assignee of the present application, and with Francis A. Friedmann; Wayne M. Wagner; and Daniel T. Risch identified as the inventors may be applied, even though the present application concerns air filters. The Friedmann et al application is incorporated herein by reference.

A tight fit between the pleats and the inner liner 8 is also desirable. This will limit pleat movement against the inner liner, and thus minimizes the likelihood that a hole will develop in the pleated paper at this location. The tight fit is facilitated when the material of the scrim 9 is one which, when heat secured to the pleat tips, tends to shrink somewhat. The material REEMAY 2011 accommodates this.

It is foreseen that in some arrangements, the principles according to the present invention may be applied in axial sealing arrangements. Under such circumstances, at least in some instances, it may be preferred to have rigid metal liners for both the inner liner 8 and the outer liner 9. This is so that an axial sealing gasket against end cap 3 can be positioned "between" the two rigid structural members, i.e., the inner and outer liners 8 and 9, which will carry the axial load. Of course, liner 9 may comprise both a layer of scrim 10 and a metal liner.

Figure 9:
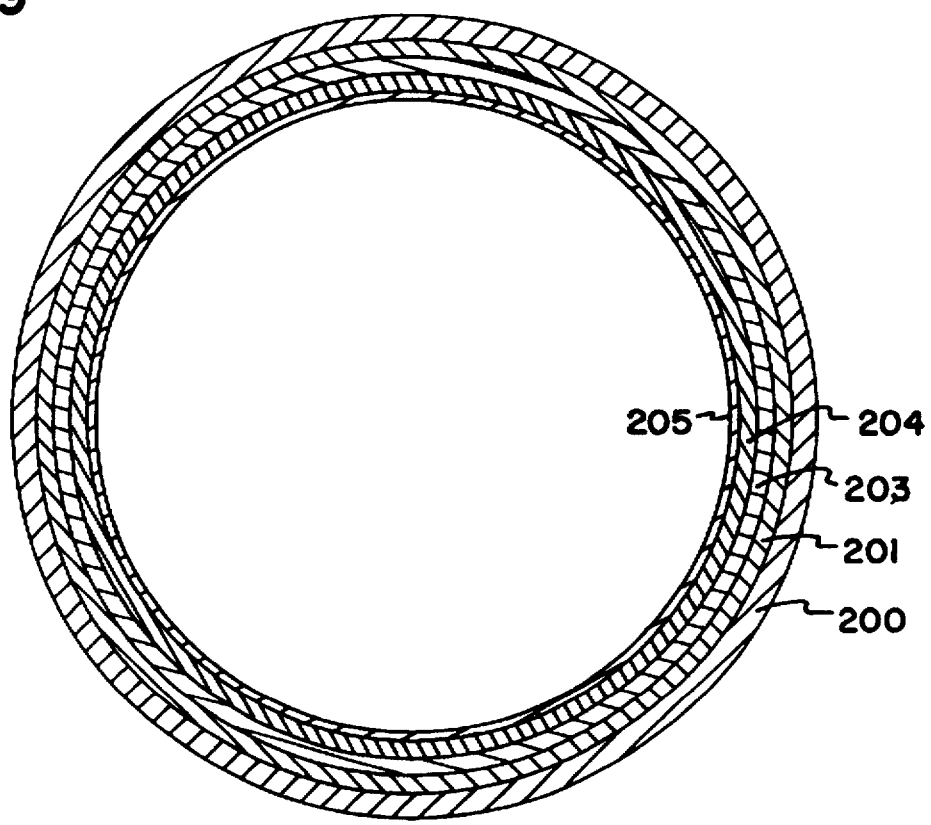
FIG. 9 is a fragmentary, schematic, cross-sectional view of a multi-layered depth media containing sleeve filter, useable in arrangements according to the present invention.

Attention is directed to FIG. 9. This figure is a schematic indicating a plurality of layers or stages that are usable in an outer sleeve 50 according to the present invention. It should be understood, however, that fewer or more layers may be used, depending upon the particular needs and design. The purpose of the schematic of FIG. 9 is to provide a basis for discussion of some possibilities.

Assume that the arrangement of FIG. 9 is an outer sleeve of a forward flow arrangement. Under such circumstances, air flow would generally be against the outermost or largest diameter layer, i.e., layer 200, with filtering flow being directed inwardly. Typically, the arrangement would be designed such that each inner layer is an equal or more efficient filter than the next outer layer. This does not mean that greater filtering actually occurs (in use) with each inner layer, but rather that if each were tested separately, it would show a greater efficiency for trapping particles, especially ones less than 5 microns. It is foreseen that in most instances, preferred designs will be such that greater "load", i.e., percentage of materials trapped by the entire system in use, occurs in the outermost layers. That is, the outermost layers would include at least some material operating as "storage" depth media, with a less high efficiency but a substantially greater capacity for storing filtered material.

Still referring to FIG. 9, the schematic arrangement includes layers 200, 201, 203 and 204. From the following discussion of a possible arrangement for use in developing an over-the-highway truck filter, some general principles for selection of materials and a wide variety of uses will be understood.

For example, in a typical system for use in an over-the-highway truck, the outer layer 200 may comprise a fibrous material, typically an organic polymer such as polyester. It would preferably have a good spring rate and compressibility. Desirable characteristics in the overall sleeve 50 that are preferably enhanced by the physical properties of the layer 200 include: an ability to compress (for ease of shipment or storage) with memory to spring back into shape; and, a substantial capacity for loading particles therein during filtering. It is foreseen that in a typical application for an over-the-highway truck, the outer layer would have a thickness of about 0.2–0.75 inches, depending on the particular application and size constraints. Usable materials include 4.2 ounce/$yd^2$ polyester depth media having a solidity (free state) of about 0.8–1.4%, available from Kem-Wove, Inc. of Charlotte, N.C. 28241, or its performance equivalent. This material comprises 40% by weight 6 denier (24 micron) fibers) and 60% by weight 1.5 denier (about 12–14 micron) fibers.

In general, useable materials for layer 200 will comprise 3.7–5.0 oz polyester depth media having % solidity (free state) within the range of 0.55–1.4% (typically comprising a blend of fiber sizes within the range of 1.5–6.0 denier). Such materials can (and will typically) be used without substantial compression, if desired.

For the particular example provided, the next inner layer 201 is about 0.15–0.4 inch thick layer of material having a greater efficiency for filtering than the next upstream (outer) layer 200, but still including a substantial capacity for loading or storage of particulates. One preferred commercially available material is a polyester material having a 1.5 denier fiber size (i.e., 12–14 microns), and a percent solidity (free state) about 1.5–1.8%. This commercially available material is Kem-Wove 8643. In general, one class of useful materials will comprise 3.0–3.9 oz/$yd^2$ polyester depth media having a % solidity (free state) within the range of 0.7–1.8% (typically comprising 1.5 denier fibers).

Preferably a contact adhesive is provided between layers 200 and 201, in outer sleeve 50. A spray-on contact adhesive such as 3M Super 77, available from 3M Company, St. Paul, Minn., may be used, to secure the two layers to one another and facilitate integrity of the sleeve 50.

If the arrangement in the schematic of FIG. 9 is applied in the particular embodiment of FIG. 8, it will be understood that the two outer layers thus far defined (i.e. layers 200 and 201) are the two layers which are stretched or expanded over the ramp 28, to seal with end cap 3. Thus, they will preferably have been chosen from materials which can expand somewhat, and have sufficient memory to retain a snug fit.

In contrast, the inner layers 203 and 204 of FIG. 9, if applied in the embodiment of FIG. 8, would be layers that are not expanded over ramp 28, but rather terminate at end cap 3 and are not stretched for a snug fit. These layers then may comprise material which is itself is not very stretchy, or which is secured to a backing or scrim that does not stretch significantly.

Still referring to FIG. 9, for the example described, the inner layer 203 comprises a polymeric fiber which is relatively fine and has a higher filtering efficiency than either layers 201 or 200. In typical embodiments it will have a thickness of about 0.08–0.3 inches. A usable commercially available material for layer 203 is AF18 available from Schuller International Inc. of Denver, Colo. 80217. It is secured to layer 201 by means of a contact adhesive.

It is foreseen that in some preferred arrangements, both layers 203 and 204 will comprise the same material, for example (AF18). It is also foreseen that in many preferred arrangements the most downstream (interior) surface of the sleeve 50, indicated in FIG. 9 at 205 will comprise a scrim, preferably a spunbonded polyester scrim of about 0.004–0.010 inches thick. A commercially usable such material is REEMAY 2011 which has a weight of 0.7 oz per square yard. A desirable option some instances is to utilize a scrim having fine fiber thereon, to provide some additional filtering protection. Fine fiber technology which can be adapted to this use is described in U.S. Pat. No. 4,650,506 assigned to Donaldson Company, Inc. of Minneapolis, Minn. In some instances multi-layers of scrim may be used, especially, for example, to enhance filter efficiency.

In general, an important consideration in selecting materials for the various layers is appropriate building of the gradient. While it is preferred that each layer have an equal or greater efficiency for filtering, than the next layer upstream; and, preferably, that the system include at least three layers having different filtering efficiency; if the gradient between any given two layers is too abrupt, the arrangement is less likely to perform well in meeting its objectives in use. This is because a relatively abrupt gradient may lead to a premature plugging or loading in the more downstream, more efficient, layers.

In general, the objective of the first stage (most upstream) media is to collect and store a major portion (e.g. 70–90% by weight) of the airborne particles entering the filter during its intended lifetime. Its suitability for this purpose is determined by its fiber size, solidity and thickness. Thickness is limited to the portion of the overall thickness that can be allocated to the first stage media, usually about ½ of the overall thickness. A media that is too high in solidity or of too fine a fiber size will be too efficient and plug prematurely. On the other hand, the preferred first stage media should have adequate efficiency to protect the downstream media from plugging prematurely from excessive numbers of particles. A media, found through experience to satisfy the requirements of the stage one (most upstream) media for the over-the-highway trucks, is the Kem-Wove 4.2 oz depth media.

The final stage (most downstream) depth media in the removable and replaceable part of the element is selected to have a high efficiency that will protect the pleated inner filter from plugging over several (and sometimes up to as many as 10 to 20) changes of the sleeve filter. The final stage media is also selected for its effectiveness (i.e. efficiency and storage capacity) on submicron particles that typically penetrate the upstream stages. Media found through experience to satisfy this requirement includes AF18.

Thus, the sleeve filter consists of a multilayered depth media in which: efficiency typically increases from upstream to downstream layers and dust storage capacity typically decreases from upstream to downstream layers. The first (most upstream) layers see the greatest quantity of contaminant and therefore must have a high dust-holding capacity. For state-of-the-art depth filter media, high storage capacity requires larger fibers (e.g. 12 to 24 microns) and large interfiber spaces (i.e. low solidity). As a result, efficiency of high storage media is limited. Solidity is generally a good indicator of the efficiency and storage capacity of these larger fiber media.

Because of the prefiltration of upstream layers, particle exposure of downstream layers is reduced. Also, as a consequence of the upstream layers, downstream layers typically see a finer particle size than upstream layers.

Therefore, higher efficiency depth media (i.e. smaller fibers and/or higher solidity) can be utilized for the downstream layers. To achieve the high efficiency required to protect the pleated inner filter from premature plugging, the final (downstream) layer of media may utilize fibers less than 5 microns in diameter. Solidities of these fine fiber media cannot always be compared directly with solidities of the coarser upstream media.

Because of the inadequacy of solidity as the only measure of performance for both coarse and fine fiber media, an efficiency measurement has been used to characterize media for the sleeve filter. The test measures efficiency of filter media on 0.78 micron polystyrene particles at a standard flow of 20 fpm (feet per minute). In this test neutralized polystyrene particles are dispersed into a dry air stream at a low particle concentration upstream of a 3 inch diameter test filter. A particle counter is used to measure efficiency of the test sample. Because of the speed of the test, several efficiency readings can be made on different portions of the media. These readings are then averaged to determine the media efficiency.

The table below lists the 0.78 micron particle efficiencies of the various medias discussed with respect to the present embodiments of the sleeve filter:

| Media | Efficiency (percent) |
|---|---|
| Kem-Wove 4.2 oz | 5–6% |
| Kem-Wove 8643 | 8% |
| AF18 | 10–11% |

In general then, in certain preferred systems: the most upstream region(s) of depth media in the sleeve filter is a material which has an efficiency (for 0.78 micron polyester particles under the test conditions) of less than about 6% (preferably 5–6%); the next downstream region(s) comprise material which has an efficiency (for 0.78 micron polyester particles under the test conditions) of 7–9% (preferably about 8%); and the next downstream region (preferably the most downstream region) is a layer (or layers) of material having an efficiency for filtering, of such particles, of at least 10%, typically 10–11%. In this characterization, the efficiency is with respect to the material tested outside of the construction.

Formation of End Skirt

Figure 11:
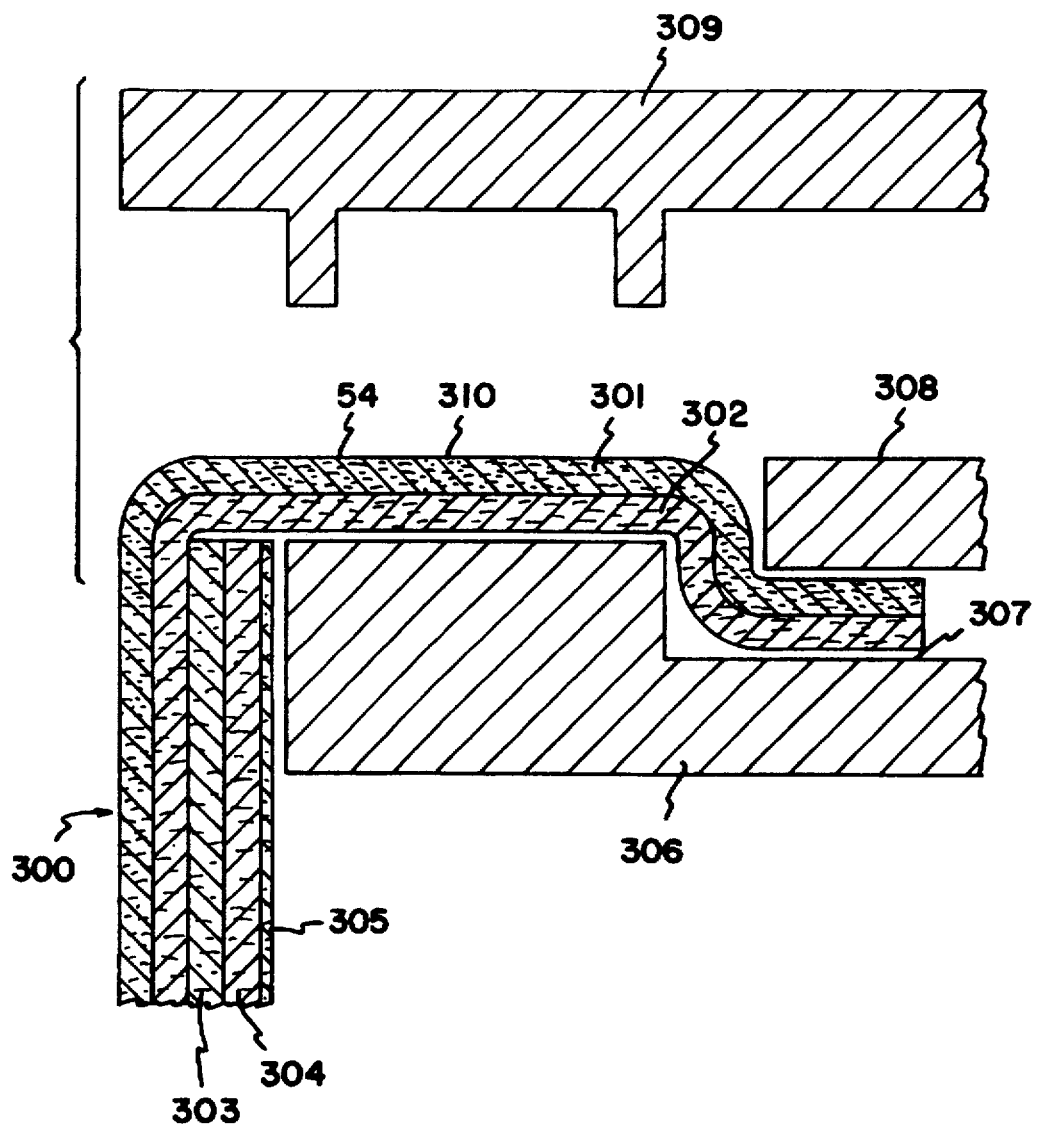
FIG. 11 is a fragmentary schematic depiction of a process of forming an end skirt in certain filter sleeves according to the present invention.

Attention is now directed to FIG. 11. FIG. 11 is a schematic depiction of a step of forming an end skirt, such as end skirt 54, in a filter sleeve according to the present invention. Referring to FIG. 11, a cylindrically disposed filter media is indicated generally at 300. The media 300 includes end sections 301 and 302, of the outer two layers which are folded over to form the end skirt. The outer two layers 301 and 302 will generally correspond to layers 55, 56, FIG. 3. The inner two layers and scrim are indicated at 303, 304 and 305 respectively.

In FIG. 11, outer layers 301 and 302 are folded over die 306, and are secured in die recess 307 by second die 308. In operation, third die 309, which is a heated die, is pressed down against surface 310. Being heated, it will melt the polymeric materials in this region, and press form the end skirt. A cutting or trimming operation can be used to form skirt 54 in the configuration FIG. 7.

Alternate Embodiment-Reverse Flow Arrangements

Certain techniques according to the present invention can be utilized in reverse flow arrangements. This is illustrated in FIG. 10, which is a cross-sectional view of a reverse flow arrangement involving principles according to the present invention.

Figure 10:
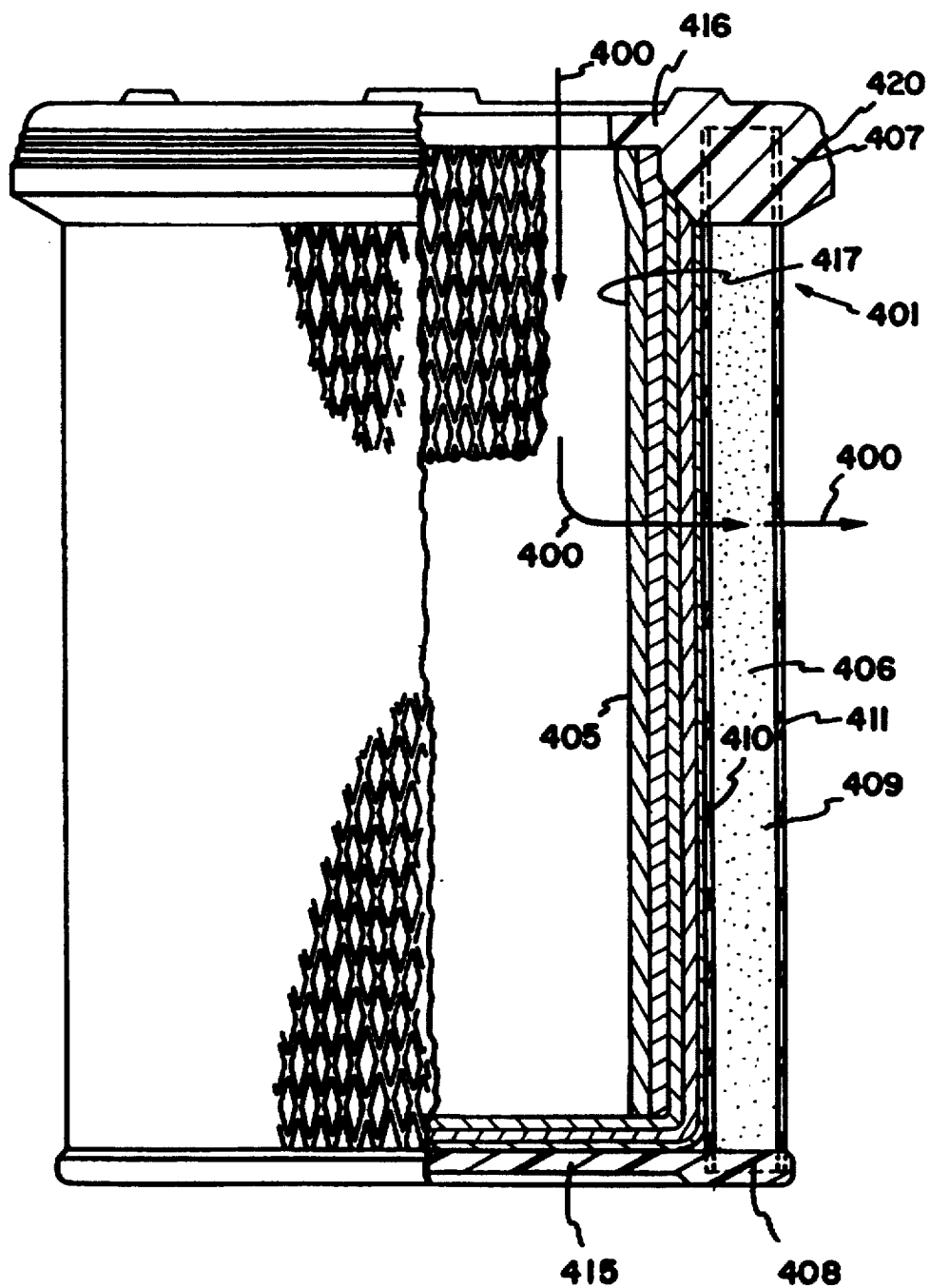
FIG. 10 is a cross-sectional view of an alternate filter construction according to the present invention, with a removable and replaceable depth media filter positioned inside of another filter element.

In general the reverse flow filter arrangement is one wherein the filtering air flows from the inside of the filter directed toward the outside, as indicated by arrows 400, FIG. 10. Referring to FIG. 10, filter element construction 401 includes an inner, removable and replaceable filter 405 and an outer, rigid, filter 406. The inner, removable and replaceable filter 405 generally comprises depth media in the form of a cylinder, and may have either an open end at its bottom, or a closed end. It may be viewed as a form of sock filter. The outer filter 406 comprises a cylindrical pleated paper filter element having end caps 407 and 408. The particular element 406 shown has media comprising pleated paper 409 extending between end caps 407 and 408. The outer filter 406 also includes inner and outer liners 410 and 411. The pleated paper, and inner and outer liners, are potted or embedded in the end caps 407 and 408.

For the arrangement of FIG. 10, the outer rigid filter 406 has a closed end 415 and an open end 416. Air to be filtered is passed through open end 416 and into interior chamber 417 of the outer filter. The inner removable and replaceable filter 405 is positioned within inner chamber 417, so that air to be filtered passes through the filter 405 before it passes through the rigid outer filter 406. It will be understood that after a period of use, the inner filter 405 can be removed and replaced. The inner filter may generally comprise a compressible cylindrical construction, and may include multiple layers of depth media. Choices of material for the inner filter 406 will generally be made utilizing the same principles as discussed above for the removable and replaceable outer sleeve filter in the arrangements of FIGS. 1–8. Similarly, the materials chosen for the outer filter 406 may be generally selected under the same guiding principles as discussed above with respect to the inner filter of the embodiment of FIGS. 1–8. In some instances the hole in end cap 416 though which the inner filter 405 is inserted during use may have a smaller inside diameter, than the outside diameter of the inner filter 405, when it is expanded. This is permissible, since the inner filter is preferably made from a collapsible material, so that it can be collapsed, inserted through open end 416, and then be expanded for preferred positioning.

For the particular arrangement depicted in FIG. 10, it is foreseen that sealing of the element within a housing will be by engagement with outer peripheral rim 420 of end cap 407. When this is to be done, the material of end cap 407 is preferably a soft compressible polyurethane material similar to that described above with respect to radial seals in FIGS. 1–8, and can be compressed into an appropriately sized rim in a housing, to provide sealing. While alternate sealing arrangements are feasible, the O.D. radial seal described is particularly convenient and easy to effect.

Some Variations Using the Principles of the Present Invention

From the discussions above, and the variations reflected in the drawings, it will be apparent that principles according to the present invention may be applied in a wide variety of applications and with a variety of structures. For example, as indicated, the removable and replaceable filtering component can be constructed from a variety of materials and in a variety of configurations. It can be constructed from depth media, agglomerating media, high efficiency media, or some combination. It may be provided as a gradient filter, to advantage. It may include a scrim liner thereon, for retention of a desirable configuration and shape, and to facilitate mounting.

The filter construction can be arranged so that the removable and replaceable filter is a sleeve, or an internally received component.

In some arrangements it may be desirable to utilize a reinforcing structure to support the removable and replaceable filter component. Consider for example the arrangement shown in FIG. 8. It is conceivable that a useful variation would be to construct the arrangement so that the cover 86 includes structural components thereon which project well into region 92. In use, the filter sleeve could be secured to the structure on the cover, and be supported thereby. Thus, when the cover is placed on the housing, the structure would project around the internally received rigid filter 1 and would support the outer filter sleeve 50.

In some arrangements, means for securing the open end of the sleeve, corresponding to ends 65, 66 in FIG. 6, to the adjacent end cap, corresponding to end cap 3 in FIG. 6, can be provided. For example, a band or clamp could be used around the outer circumference of the sleeve to secure the sleeve to the end cap in this location. With such an arrangement, generally it would be required that, to change the removable and replaceable outer sleeve, the entire filter assembly can be dismounted from the housing. Although this loss of advantage would be associated with such constructions, other advantages described herein would still be obtained.

Of course it is foreseen that a variety of geometric configurations could be used for: the rigid filter element, for example inner element 1 of FIG. 1; the removable and replaceable filter sleeve, for example sleeve 50, FIG. 3; and, the housing. Non-cylindrical constructions, for example, could be used for any or all of the components, in some systems. There is no particular reason, for example, why a cross-section of both the inner and outer surface of sleeve 50 must be circular. A circular inner cross-section to facilitate snug fit with an inner filter member 1 of circular outer cross-section may be desirable. However, with such an arrangement, a non-circular outer surface to sleeve 50 could also be used, to correspond to a housing having a different internal cross-section than circular.

EXAMPLES

The following example provides further guidance to application of principles according to the present invention.

A typical filter element construction, according to the present invention, made for use in a city delivery type of truck, to replace a Donaldson P52-2606 filter element, designed to handle a flow of 500–600 CFM (cubic feet per minute), would be as follows:

The internal filter element would generally be configured as shown in FIGS. 1–3. The outside diameter of the open end cap 3 would be about 7–8 inches. The inside diameter of end cap 3 would be about 6 inches, at the upper surface 20, and would decrease to about 5.25 inches at its narrowest point, FIG. 6. The total thickness of the portion of end cap 3 which forms the radial seal, at its thickest point, i.e. along region 32, would be about 0.435 inches. The end cap material for end cap 3 would be a foamed polyurethane, as described hereinabove.

The second end cap 4 would preferably comprise hard urethane, as described hereinabove. It would preferably be about 0.31 inch thick and have an outside diameter of about 7.5 inches. The outside diameter would extend or project about 0.125 inch beyond the outer liner 9.

The pleated paper 6 would have about 0.625 inch pleats and would preferably be an oil-pleated paper media, in particular an oil treated high perm cellulose. It would be constructed about 12 inches long and in a cylindrical configuration having an inside diameter of about 6 inches. Preferably there would be about 12 pleats per inch, around the outside diameter. The inner liner would comprise expanded metal.

The outer sleeve 50 would comprise four layers of depth media in an internal scrim. The outermost layer would be about 0.3 inch deep and comprise Kem-Wove 4.2 or its functional (filtering) equivalent. The next inner layer would be about 0.3 inch deep and comprise Kem-Wove 8643 or its functional (filtering) equivalent. The outer two layers would be secured to one another with 3M Super 77.

The inner two layers of depth media would each comprise a layer about 0.2 inch deep of AF18. The innermost layer would be lined along its inside surface with a REEMAY 2011 scrim. The inner layer and scrim would be bonded to one another with 3M Super 77.

When constructed as described above, the filter element construction would be sized and shaped appropriately to fit within a conventional Donaldson EP G110138, EP G110118, EP G11014008, EP G110158 housing.

What is claimed is:

1. An air filter arrangement for filtering particulate matter from incoming air to an engine air intake; said arrangement comprising:
   (a) a first construction having an upstream side;
      (i) said construction comprising first and second end caps with filter media extending therebetween; said construction including an inner cylindrical liner; said first end cap having a central air flow aperture therein;
   (b) a removable and replaceable sleeve filter of media positioned in covering relation to said first construction upstream side; said removable and replaceable sleeve filter including:
      (i) an outermost layer of media comprising fibrous depth media having a first efficiency for filtering;
      (ii) a second layer of media downstream from said outermost layer; said second layer of media having an efficiency for filtering which is different from said outermost layer; and,
      (iii) said outermost layer and said second layer being secured together to form a removable and replaceable sleeve filter; said sleeve filter being continuous and without a nonpermanent seam.

2. An air filter arrangement according to claim 1 wherein:
   (a) said second layer has a greater efficiency for filtering than said outermost layer.

3. An air filter arrangement according to claim 1 wherein:
   (a) said second layer comprises fibrous depth media.

4. An air filter arrangement according to claim 1 wherein:
   (a) said outermost layer has a percent solidity, free state, within the range of about 0.8–1.4%.

5. An air filter arrangement according to claim 1 wherein:
   (a) said outermost layer comprises fibrous depth media which includes a blend of fiber sizes.

6. An air filter arrangement according to claim 5 wherein:
   (a) said blend of fiber sizes comprises a blend of fiber sizes within the range of 1.5–6.0 denier.

7. An air filter arrangement according to claim 5 wherein:
   (a) said outermost layer comprises polyester fibers.

8. An air filter arrangement according to claim 7 wherein:
   (a) said outermost layer has a thickness of about 0.2–0.75 inches.

9. An air filter arrangement according to claim 8 wherein:
   (a) said second layer has a thickness of about 0.15–0.4 inches.

10. An air filter arrangement according to claim 8 wherein:

(a) said first construction comprises a cylindrical media construction wherein said first and second end caps are circular.

11. An air filter arrangement according to claim 10 wherein:

(a) said first construction comprises a cylindrical extension of pleated media embedded in, and extending between, said first and second end caps.

12. An air filter arrangement according to claim 11 wherein:

(a) said cylindrical extension of pleated media comprises pleated paper media.

13. An air filter arrangement according to claim 12 wherein:

(a) said pleated paper media comprises oil treated cellulose media.

14. An air filter arrangement according to claim 12 wherein:

(a) said first construction and said removable and replaceable sleeve filter are constructed and arranged to withstand, when assembled, a limiting pressure drop thereacross of at least about 20 inches of water, without structural collapse and failure.

15. An air filter arrangement according to claim 12 wherein:

(a) said pleated media has a pleat depth of at least 0.375 inches.

16. An air filter arrangement according to claim 15 wherein:

(a) said first end cap has an outer diameter of 4.5 to 13 inches.

17. An air filter construction according to claim 15 wherein:

(a) said first construction includes an outer liner; and, (b) said removable and replaceable sleeve filter is of an appropriate size to cover said outer liner.

18. An air filter construction according to claim 17 wherein:

(a) said outer liner comprises a metal liner.

19. An air filter construction according to claim 18 wherein:

(a) said removable and replaceable sleeve filter is constructed and arranged for operational collection therein of at least 90%, by weight, of particulates collected by said air filter arrangement in use.

20. An air filter construction according to claim 19 wherein:

(a) said outermost layer is constructed and arranged to store 70–90%, by weight, of airborne particles which pass into the filter arrangement, during a lifetime of normal use for the removable and replaceable sleeve filter.

21. An air filter construction according to claim 1 wherein:

(a) said second end cap is a closed end cap with no air flow aperture therethrough.

22. An air filter construction according to claim 1 wherein:

(a) said outermost layer has a percent solidity, free state, within the range of about 0.55–1.4%.

* * * * *

UNITED STATES PATENT AND TRADEMARK OFFICE
CERTIFICATE OF CORRECTION

PATENT NO. : 5,797,973

DATED : AUGUST 25, 1998

INVENTOR(S) : DUDREY ET AL.

It is certified that error appears in the above-identified patent and that said Letters Patent is hereby corrected as shown below:

Col. 7, line 13: insert —be— after "will"

Col. 14, line 67: delete "," after "trapping"

Col. 16, line 2: insert —many— after "unlike"

Col. 18, line 9: insert —in— after "option"

Signed and Sealed this

Ninth Day of November, 1999

Q. TODD DICKINSON

*Attest:*

*Attesting Officer*   Acting Commissioner of Patents and Trademarks